United States Patent
Lakshmanan et al.

(10) Patent No.: US 7,436,143 B2
(45) Date of Patent: Oct. 14, 2008

(54) MINIATURE SURVEILLANCE ROBOT

(75) Inventors: Sridhar Lakshmanan, Belleville, MI (US); Vin Joe Varghese, Ann Arbor, MI (US); Narasimhamurthi Natarajan, Ann Arbor, MI (US)

(73) Assignee: M-Bots, Inc., Sterling Heights, MI (US)

( * ) Notice: Subject to any disclaimer, the term of this patent is extended or adjusted under 35 U.S.C. 154(b) by 0 days.

(21) Appl. No.: 11/411,426

(22) Filed: Apr. 25, 2006

(65) Prior Publication Data
US 2007/0046237 A1 Mar. 1, 2007

Related U.S. Application Data

(60) Provisional application No. 60/674,915, filed on Apr. 25, 2005.

(51) Int. Cl.
*B64C 13/20* (2006.01)

(52) U.S. Cl. .............. 318/581; 318/568.12; 318/569; 318/587; 318/580

(58) Field of Classification Search .............. 318/581, 318/568.12, 567, 568.16, 568.24, 569, 568.25, 318/587, 580; 340/628, 541; 700/245; 901/1
See application file for complete search history.

(56) References Cited

U.S. PATENT DOCUMENTS

| | | | |
|---|---|---|---|
| 2003/0234730 A1* | 12/2003 | Arms et al. ............. 340/870.01 |
| 2005/0071047 A1* | 3/2005 | Okabayashi et al. ........ 700/245 |
| 2005/0192721 A1* | 9/2005 | Jouppi ......................... 701/24 |
| 2005/0222712 A1* | 10/2005 | Orita .......................... 700/246 |
| 2005/0237189 A1* | 10/2005 | Tani ............................ 340/541 |
| 2005/0267633 A1* | 12/2005 | Waita ......................... 700/245 |
| 2006/0061478 A1* | 3/2006 | Kim ............................ 340/628 |
| 2006/0069463 A1* | 3/2006 | Kim ............................ 700/245 |

* cited by examiner

*Primary Examiner*—Karen Masih
(74) *Attorney, Agent, or Firm*—Rohm & Monsanto, PLC

(57) ABSTRACT

A robotic system has a drive chassis having a drive motor and a drive element attached to the first drive motor. Additionally, a motor controller system provides drive signals to the first drive motor. A logic controller provides control signals to the motor controller. A network system is provided for communicating with the logic controller. At least one peripheral element communicates with the network system. There is additionally provided a wireless arrangement for communicating wirelessly with the network system.

20 Claims, 1 Drawing Sheet

MINIATURE SURVEILLANCE ROBOT

RELATIONSHIP TO OTHER APPLICATION(S)

This application claims the benefit of Provisional Patent Application Ser. No. 60/674,915, filed Apr. 25, 2005. The disclosure in that provisional patent application is incorporated herein by reference.

BACKGROUND OF THE INVENTION

1. Field of the Invention

This invention relates generally to robotic systems, and more particularly, to a miniature robotic system that is particularly adapted for surveillance.

2. Description of the Related Art

There is a need for a robotic system that can be controlled remotely whereby the human operator is removed from proximity to danger. Additionally, there is a need for a robotic system that extends the sensory perception of one or more human operators to remote locations. Such a robotic system would be useful in locating, and communicating with, disabled or trapped personnel.

One particularly useful functionality of a small robotic system is to conduct inspections of the under carriage of vehicles that need to be searched for explosives or contraband. When equipped with chemical sensors, a small robotic system would be useful in the detection of buried explosives, such as mines and bombs.

SUMMARY OF THE INVENTION

The foregoing and other objects are achieved by this invention which provides, in accordance with a first apparatus aspect, a robotic system, having a drive chassis having a first drive motor. A first drive element is attached to the first drive motor. Additionally, a motor controller system provides drive signals to the first drive motor. A logic controller provides control signals to the motor controller. A network system is provided for communicating with the logic controller. At least one peripheral element communicates with the network system. There is additionally provided a wireless arrangement for communicating wirelessly with the network system.

In one embodiment, there is further provided a second drive element, the first and second drive elements constitutes a track arrangement. In a further embodiment, the first element constitutes a wheel.

The peripheral element communicates with the network system using File Transfer Protocol (FTP). Alternatively, such communication is effected using User Datagram Protocol (UDP) or Transmission Control Protocol (TCP).

Preferably, the peripheral element is a camera. The camera is configured for navigation of the robotic system, and may additionally be employed for conducting inspection of the underside of a vehicle desired to be inspected. It may additionally be provided with a built-in web server. In other embodiments, the peripheral element is an illumination device, a proximity sensing system, or a chemical sensing system.

In accordance with a further apparatus aspect of the invention, a robotic system is provided with a drive chassis having a drive motor and a first drive element attached to the drive motor. A motor controller system provides drive signals to the drive motor, and a logic controller provides control signals to the motor controller. A network system communicates with the logic controller, and a peripheral element communicates with the network system. There is additionally provided a wireless arrangement for facilitating wireless communication with the network system, and a remote manipulable controller transceiver for communicating wirelessly with the wireless arrangement.

In one embodiment of this further aspect of the invention, the remote manipulable controller transceiver is provided with a display system for provided indication to a user responsive to the peripheral element.

The peripheral element is, in a practicable embodiment, a camera. The camera is controllable from the remote manipulable controller transceiver. Moreover, the remote manipulable controller transceiver is a remote computer, and the wireless arrangement establishes wireless communication between the network system and the web.

In a still further apparatus aspect of the invention, a robotic system is provided with a drive chassis having a drive motor and a first drive element attached to the drive motor. A motor controller system provides drive signals to the drive motor, and a logic controller provides control signals to the motor controller. A network system communicates with the logic controller, and a peripheral element communicates with the network system. There is additionally provided a wireless arrangement for facilitating wireless communication with the network system, and a remote manipulable controller transceiver for communicating wirelessly between the wireless arrangement and the web.

With respect to onboard hardware, the computational power of the robotic system of the present invention is derived from a commercially available single board computer with a modem operating system. More specifically, the computer is based on the ARM7 processor, running the Linux operating system. The computer has two serial communication ports, with one of them being the primary console terminal port. In addition it has two high speed USB ports and one Ethernet port. The use of the Linux operating system ensures good support of networking, a stable operating platform and plethora of non-proprietary applications and a wide support base.

In one embodiment, the robotic system of the present invention uses a commercially available, IP ready, low-light, pan-tilt-zoom camera. The preferred camera has a built-in web server, and all access to the camera control and the camera image is obtained via the web server. In various embodiments, the camera is configured to connect to the internet either wirelessly or with a wired Ethernet cable. On a reduced cost robotic system, the camera need not have wireless capabilities. The camera can pan a total of 180° and a tilt a total of 90°. Preferably, the camera is installed such that at one extreme of the tilt, the view of the camera is directly forward and at the other extreme it views directly upward. Thus, the preferred camera arrangement of the robotic system of the present invention is useful for navigation (when looking forward) as well as undercarriage inspection (when looking upward). In some embodiments, the video camera includes one or more cameras that operate in a variety of wavelengths, such near-, short-wave, mid-wave, and/or long-wave infrared. In addition, to panning (side-to-side), tilting (up-down), and zooming (in-out), the camera of some embodiments of the invention can be lifted, illustratively up to 12 feet. In a highly advantageous embodiment, the robotic system or the operator control unit combines a video sequence into a single composite mosaic image, such as, but not limited to, the undercarriage of a car. The composite (undercarriage) mosaic image is then compared side-by-side, by an operator, or automatically against a reference image obtained from a database (undercarriage) images of the same scene.

In an advantageous embodiment of the invention, communication of audio data between the robot and the operator control unit is performed over the same channel as the video and the control data.

The motor controller that is used in one embodiment of the present invention is a commercially available serial controller. The controller receives its commands from a computer using serial communication, and controls the speed of the drive motors.

The power source used in one embodiment of the present invention is a commercially available lithium ion smart battery. An important feature of the battery is that it is possible to determine the state-of-charge of the battery. The battery is attached to the robotic system of the present invention by clamps that prevent accidental dislodging of the battery when the present robotic system is in use.

In a highly advantageous embodiment, all the power demands of the components are supplied by a commercially available DC-DC converter that converts the battery voltage to the various voltage levels required by the different components onboard.

The present invention employs in certain embodiments one or more on-board infrared proximity sensors. These sensors can be used to navigate semi-autonomously without bumping into other objects. In some embodiments, the sensor is used to provide a depth map of the world around the robot that can be generated in on-board memory, or at a remote control station. The operator remote control unit can be positioned in a variety of ways, including but not limited to, held in the hand of the operator, mounted on a tripod, positioned on a flat surface, hung from a shoulder or waist-like harness, worn like a wrist band, integrated into a helmet, and combinations thereof. Alternatively, the remote control unit can be a remote computer coupled to the robotic system via the web.

Other sensors such as, but not limited to, explosives detectors, chemical detectors, nuclear radiation detectors, biological agent detectors, and microwave/millimeter-wave/ultra-wide-band radar may be used in conjunction with the robotic stem of the invention. Additionally, a living being presence detector system is included in certain embodiments. In other embodiments, an acoustic array is used to detect the source of origin of known acoustic signatures, including but not limited to chirps, whistles, beeps, sirens, gun shots, and explosions. Still further, various embodiments of the robotic system are equipped with temperature, pressure, acceleration, velocity, and position sensors systems. The robotic system can be triggered by any such stimulations, and programmed to alert a remote human operator of same. Moreover, data corresponding thereto can be stored in the robot system's computer, the operator control unit's computer, or some other remote data storage device.

In some embodiments, the sensor payload is separate from the chassis of the robotic system and is connected to the robot via a articulated electromechanical connector such as a hitch-and-post. Alternatively, the sensor payload is connected to the robot via a rigid electromechanical connector such as one or more pin connectors with latches. The separate sensor payload may has powered wheels, and can be controlled using the same operator control unit as that of the normal robot.

An onboard a USB wireless network interface card connects to the internet the robotic system wirelessly. The interface card preferably is able to communicate using either the 802.11b or 802.11g communications protocols.

One of the serial ports on the computer is dedicated as the console port and is used to connect to the computer. The second serial port is connected to the serial motor controller and is used to send commands to the controller.

One of the two USB ports is connected to the wireless network interface card. The robotic system of the present invention communicates with off-board devices using this connection. The second USB port is used to expand the file space capacity of the computer.

An Ethernet port is typically connected to the camera. This allows the camera to connect to the internet via the single board computer. In those embodiments where adequate wireless capabilities built into the camera, the Ethernet port can be used for high speed connectivity to the internet.

A digital I/O port is used in some embodiments of the invention to control and monitor digitally payloads on the robotic system of the present invention.

An analog port is useful in certain embodiments to obtain analog measurements on various possible payloads.

In a highly advantageous embodiment, the onboard computer of the present robotic system runs two key programs. The first is a control interface used to tele-operate the robot. This program listens to the incoming UDP packets from the internet on specific port. It translates incoming control commands to appropriate serial controller instructions. All commands to the robot are received by this program. This program also monitors periodically checks t make sure that robot is in communication with the base unit. If the robot is not in autonomous mode and the link to the base is lost, the program will halt the robot.

The second program constitutes is a fully operably web server. One important function of the web server is to download a java applet to the controller when needed. This applet is specific to the robot so the remote controller is not tied to a specific robot. To control the robot, all the operator needs is a browser that can run java applets (now universal). The user connects to a page on the robot using the familiar http URL. When the user successfully logs in to the server, the server will download the control java applet. In addition, the server on the robot also functions as a file server. Any one wishing to take advantage of any special features in the controller that is not accessible from a java applet (such as a joystick) can download the software from the server as needed. This eliminates the logistics of distributing controller programs, and customizing the programs for a specific robot. Also, one can ensure that the controllers will always have the latest version of the program for a specific robot by keeping the latest version on the robot and downloading it whenever the robot is to be controlled.

The remote controller can be any computer that has a java enabled browser (almost all the browsers are java enabled) and a connection to the internet. For security reasons it may be advantageous to have the robot, the IP ready camera, as well as the controller, on the same wireless network. However, this is not required. All that is required is internet connectivity. All communications with the robot and the camera use this internet connection. This is especially important with wireless connections wherein a single high gain amplifier for boosting signal strength is all that is required to increase the range of operation. Also, from a security point of view, it is sufficient to secure this single link.

In a highly advantageous embodiment of the invention, any operator control unit with any robot. Additionally, a single operator control unit can be used to control multiple robots. Alternately, a single robot can be controlled through multiple operator control units. Thus, an arbitrary group of robots can be controlled by another arbitrary group of operator control units, In still further embodiments, some of the operator control units do not control the robot but only allow the operator to see live videos from the robot(s)'s video camera(s).

To control the robot, the user connects to the website hosted on the robot. This page contains a small java applet that is automatically downloaded to the controller. The applet is a small program that tracks mouse movements and sends the appropriate UDP packets to the robot. Since the applet is on the robot and is automatically downloaded to the controller, there is no need to install any special software on the controller. This flexible approach provides plural advantages.

In the simplest case where it is desired to control a single-robot controller, the control person, using the remote control computer logs on to the website hosted on the robot, and thereby is enabled to control the robot.

When more than one operator connected to a single robot, the control applet is downloaded to each of the controllers. Thus, each user is enabled to control the robot independent of the other users as each controller will be running the control program and sending User Datagram Protocol (UDP) packets independent of the others. UDP is one of two transport layer protocols within the Transmission Control Protocol/Internet Protocol (TCP/IP) suite. Unlike TCP, which is intended for reliable, connection-oriented sessions between two hosts, UDP is a connectionless protocol in which packets are sent without first negotiating a connection between the sending and receiving hosts. UDP also does not include the segmentation, sequencing, flow control, acknowledgment, and retransmission features of TCP and is therefore an "unreliable" or "best-effort delivery" protocol. More specifically, there is no guarantee that a packet sent will reach its intended recipient. Reliable delivery of UDP packets is the responsibility of application layer protocols above it that use UDP as their underlying network transport. UDP packets do include a checksum header, however, to ensure the integrity of packets that reach their destination.

Because of these characteristics, UDP is considered the more "lightweight" of the two TCP/IP transport layer protocols. Although TCP is used for one-to-one communication between two hosts-in other words, for unicasting, UDP is particularly useful for one-to-many communication, which includes both broadcasting and multicasting. UDP is a simpler protocol than TCP, principally because it does not need to include mechanisms relating to establishing, maintaining, and tearing down sessions between hosts. Neither UDP nor TCP include fields for source and destination address in their headers is because the underlying network layer protocol called Internet Protocol (IP) is responsible for such addressing.

In the case of several robots being controlled by a single controller, the controller will connect to several robot website simultaneously. The robot for which the home page is active will be the one under the control of the controller.

The control of the camera and the two way voice is also performed in certain embodiments of the invention over the internet. The access to the camera will be via the controller page on the robot. Thus the controller does not require any specialized software to control the camera and the two way voice communication. Also, the software to control the camera resides on the robot so the controller is independent of the robot.

In the simplest case, a single controller who desires to control a single camera logs on to the website hosted on the robot and controls the camera via the page on the robot. When more than one operator is connected to the robot, each user can control or view the camera on the robot. This is especially important in situations where several experts can all simultaneously view the camera and/or use two way audio independent of the operator of the robot. In some embodiments, the robotic stem and/or the camera can be controlled by the voice of a human operator, and can effect communication in a variety of languages.

In addition to the foregoing, in some embodiments of the invention the controller can connect to more than one robot's website and view the output of all of the cameras. This mode is especially useful for monitoring several locations by a central command, with the robots either in autonomous mode or under the control of another operator.

The robotic system can be programmed to achieve varying degrees of autonomy from the remote human operator, such as avoidance of obstacles, servo to a way point, sweep an area, follow a leader, and cooperate with other robotic systems. It can be programmed to function as a surveillance system, or to survey its field of regard in order to automatically the detect the occurrence of certain events such as, but not limited to, the presence or absence of motion, noise, sounds, color, shapes, faces, and letterings. In addition, the robotic system can function as a communication network repeater, relay point, or access point.

BRIEF DESCRIPTION OF THE DRAWING

Comprehension of the invention is facilitated by reading the following detailed description, in conjunction with the annexed drawing, in which.

DETAILED DESCRIPTION

Figure 1:
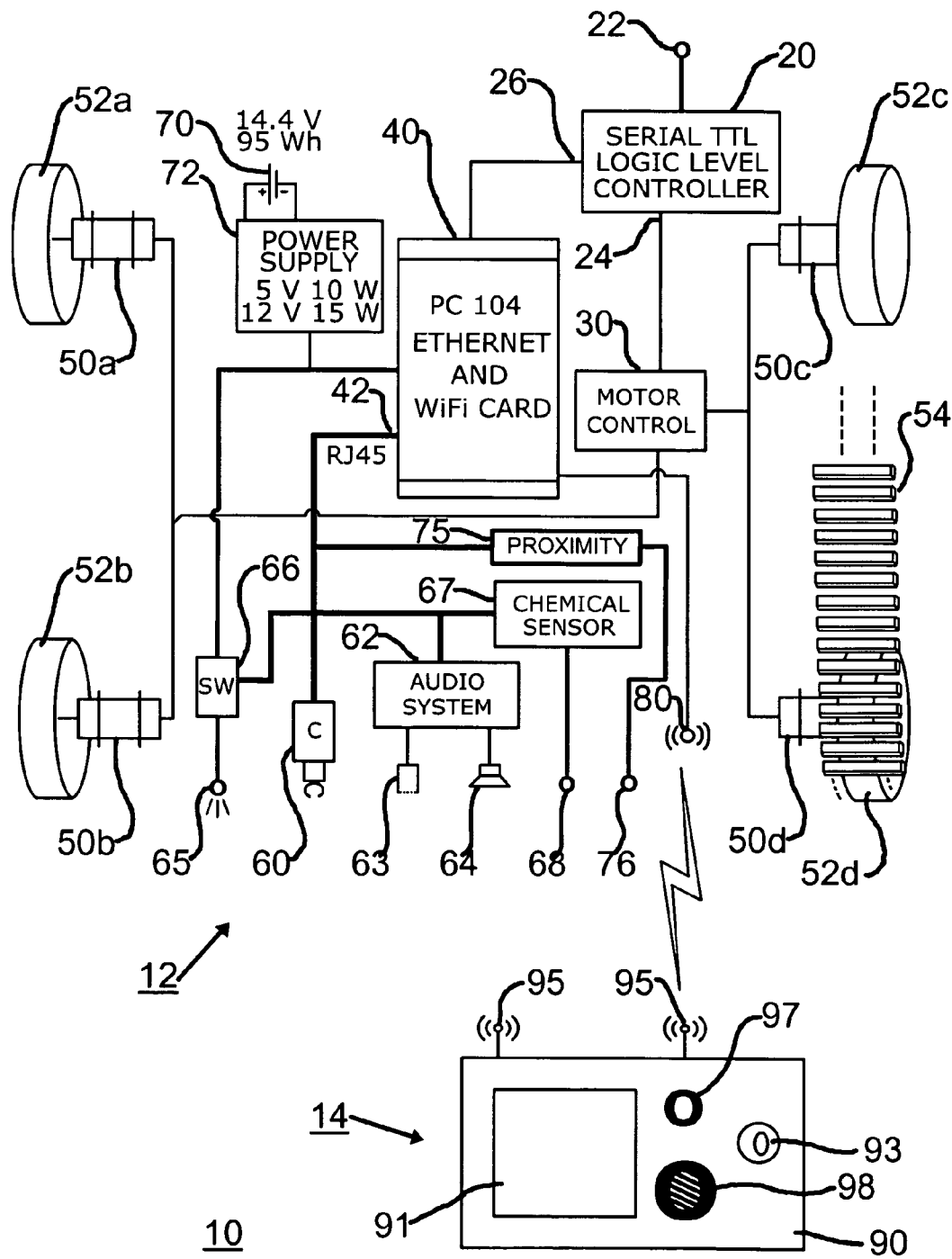
FIG. 1 is a simplified schematic representation of a specific illustrative embodiment of the robotic system of the present invention.

FIG. 1 is a simplified schematic representation of a specific illustrative embodiment of a general architecture of a remote controlled robotic system 10 constructed in accordance with the present invention. As shown in this figure, a controllable robotic system 12 is operable remotely by a remote control system 14, as will hereinbelow be described.

Controllable robotic system 12 has installed on a chassis (not shown) a processor 20 that, in this embodiment, is based on the ARM7 processor, running the Linux operating system. The computer, as previously noted, has two serial communication ports with one of them being primary console terminal port 22. The second serial port 24 is connected to a serial motor controller 30 and is used to send commands to thereto.

Processor 20, in this specific illustrative embodiment of the invention has two USB ports. One USB port 26 is connected to a network interface card 40. The robotic system of the present invention communicates with off-board devices using this connection. The second USB (not shown) port is used to expand the file space capacity of the computer.

Motor controller 30 is, as noted, an off-the-shelf serial controller. The controller receives its commands from processor 20 using serial communication. The controller in turn can control the speed of drive motors 50a, 50b, 50c, and 50d. Each of the drive motors is coupled mechanically in this embodiment to an associated one of wheels 52a, 52b, 52c, and 52d. In some embodiments of the invention, the wheels constitute portions of a track system 54. In this figure, wheels 52c and 52d are shown as part of track system 54. In a preferred embodiment, the robot can operate with its belly up or down, and can readily be rotated by 180°.

There is shown in the figure a plurality of peripheral devices connected to an Ethernet port 42 of network interface card 40. As previously noted, network interface card 40 is an onboard USB wireless network interface card that, in this specific illustrative embodiment of the invention, has Ethernet capability. Of course, in other embodiments, a separate card can be provided to effect the Ethernet functionality. In wireless mode, the interface card can communicate using either the 802.11b or 802.11g communications protocols.

One of the peripheral devices coupled to network interface card 40 is a camera 50 that, in this specific illustrative embodiment of the invention, is an off-the-shelf, IP ready, low-light, pan-tilt-zoom camera. This camera has a built in web server (not shown) and all access to the camera control and the camera image is via the web server. The camera can pan a total of 180° and a tilt a total of 90°. A previously noted, the camera is mounted in such a way that at one extreme of the tilt, the camera is looking directly forward and at the other extreme it is looking directly upward, whereby the same camera can be used both for navigation and undercarriage inspection.

Controllable robotic system 12 is powered by commercial-off-the-shelf lithium ion smart battery 70. In this specific illustrative embodiment of the invention, the state-of-charge of the battery can readily be determined. Special clamps (not shown) attach the battery to the chassis (not shown) of the robotic system to secure the battery when in use.

Battery 70 is shown to be coupled to an off-the-shelf DC-DC converter 72 that coverts the battery voltage to the various voltage levels required by the different components onboard. In this embodiment, the voltages used are 5 Volts (at 10 Watts) and 12 Volts (at 15 Watts).

A further peripheral device that is coupled to Ethernet port 42 is an audio system 62 that in this embodiment is provided with a microphone 63 and a speaker 64. This system allows controllable robotic system 12 to listen for sounds remotely an provide corresponding signals to network interface card 40, and to facilitate communication with a person at the remote location via the speaker.

In some embodiments, it is desired that controllable robotic system 12 sense for chemicals or smells. In such an embodiment, a chemical sensor system 67 receives environmental information from a chemical probe 68 and delivers corresponding information to network interface card 40.

There is additionally provided a switch 66 that delivers electrical energy from DC-DC converter 72 to an illumination device 65 in response to a signal obtained from network interface card 40.

An on-board infrared proximity sensor system 75, having a sensor 76, is used to navigate semi-autonomously without bumping into other objects.

Controllable robotic system 12 communicates wirelessly with remote control system 14 via an antenna 80 that, in this simplified schematic representation of the invention is coupled directly to network interface card 40.

Remote control system 14 has a housing 90 that contains a viewing screen 91 that may be a conventional LCD screen. The video images generated by camera 50 are visible on viewing screen 90. The housing additionally is provided with a manually actuatable control element, such as a joystick 93, that controls signals for motor controller 30. The wireless communication with antenna 80 is achieved via antenna system 95 of the remote control system. Additionally, remote control system 14 has a microphone 97 and a speaker 98, in this specific illustrative embodiment of the invention, for engaging audio system 62.

Although the invention has been described in terms of specific embodiments and applications, persons skilled in the art may, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A robotic system, comprising:
    a drive chassis having a first drive motor;
    a first drive element attached to said first drive motor;
    a motor controller system for providing drive signals to said first drive motor;
    a logic controller for providing control signals to said motor controller;
    a network system for communicating with said logic controller;
    a peripheral element for communicating with said network system; and
    a wireless arrangement for communicating wirelessly with said network system, said wireless arrangement being configured to propagate drive actuation signals from a remote drive control source to said logic controller.

2. The robotic system of claim 1, wherein there is further provided a second drive element, said first and second drive elements comprises a track arrangement.

3. The robotic system of claim 1, wherein said first element comprises a wheel.

4. The robotic system of claim 1, wherein said peripheral element communicates with said network system using File Transfer Protocol (FTP).

5. The robotic system of claim 1, wherein said peripheral element communicates with said network system using User Datagram Protocol (UDP).

6. The robotic system of claim 1, wherein said peripheral element communicates with said network system using Transmission Control Protocol (TCP).

7. The robotic system of claim 1, wherein said peripheral element is a camera.

8. The robotic system of claim 7, wherein said camera is configured to provide imaging data for navigation of the robotic system, and the drive actuation signals are responsive to the imaging data.

9. The robotic system of claim 8, wherein said camera is configured for conducting inspection of the underside of a vehicle desired to be inspected.

10. The robotic system of claim 7, wherein said camera has a built-in web server.

11. The robotic system of claim 1, wherein said peripheral element is an illumination device.

12. The robotic system of claim 1, wherein said peripheral element is a proximity sensing system.

13. The robotic system of claim 1, wherein said peripheral element is a chemical sensing system.

14. A robotic system, comprising:
    a drive chassis having a drive motor;
    a first drive element attached to said drive motor;
    a motor controller system for providing drive signals to said drive motor;
    a logic controller for providing control signals to said motor controller;
    a network system for communicating with said logic controller;
    a peripheral element for communicating with said network system;
    a wireless arrangement for facilitating wireless communication with said network system; and
    a remote manipulable controller transceiver for communicating wirelessly with said wireless arrangement, said wireless arrangement being configured to propagate drive actuation signals from said remote manipulable controller transceiver to said logic controller.

15. The robotic system of claim 14, wherein said remote manipulable controller transceiver is provided with a display system for provided indication to a user responsive to said peripheral element.

16. The robotic system of claim 14, wherein said peripheral element is a camera.

17. The robotic system of claim 16, wherein the direction of view of said camera is controllable from said remote manipulable controller transceiver.

18. The robotic system of claim 14, wherein said remote manipulable controller transceiver is a remote computer, and said wireless arrangement establishes wireless communication between said network system and the web.

19. The robotic system of claim 14, wherein said peripheral element is an infrared sensor system.

20. A robotic system, comprising:
a drive chassis having a drive motor;
a first drive element attached to said drive motor;
a motor controller system for providing drive signals to said drive motor;
a logic controller for providing control signals to said motor controller;
a network system for communicating with said logic controller;
a peripheral element for communicating with said network system; and
a wireless arrangement for facilitating wireless communication between said network system and the web, said wireless arrangement being configured to propagate drive actuation signals received from the web, to said logic controller.

* * * * *